(12) United States Patent
Alet Vidal et al.

(10) Patent No.: US 9,565,970 B2
(45) Date of Patent: Feb. 14, 2017

(54) COOKING SYSTEM INCLUDING A COOKING HOB AND A COOKING VESSEL

(71) Applicant: ELECTRODOMÉSTICOS TAURUS, SL, Barcelona (ES)

(72) Inventors: Josep Alet Vidal, Oliana (ES); Lluis Trench Roca, Sallent (ES)

(73) Assignee: ELECTRODOMESTICOS TAURUS SL, Oliana (Lleida) (ES)

( * ) Notice: Subject to any disclaimer, the term of this patent is extended or adjusted under 35 U.S.C. 154(b) by 0 days.

(21) Appl. No.: 14/951,642

(22) Filed: Nov. 25, 2015

(65) Prior Publication Data

US 2016/0073820 A1    Mar. 17, 2016

Related U.S. Application Data

(63) Continuation-in-part of application No. 13/702,618, filed as application No. PCT/ES2011/000117 on Apr. 14, 2011, now abandoned.

(51) Int. Cl.
*H05B 6/22* (2006.01)
*A47J 43/28* (2006.01)
(Continued)

(52) U.S. Cl.
CPC ............... *A47J 36/165* (2013.01); *A47J 27/62* (2013.01); *A47J 43/0465* (2013.01); *H05B 3/685* (2013.01);
(Continued)

(58) Field of Classification Search
CPC ...... A47J 27/62; A47J 43/0465; A47J 43/085;
A47J 36/32; A47J 36/165; B01F 7/162;
B01F 13/0872; H05B 6/02; H05B 3/74;
H05B 2213/06; H05B 3/685; H05B 3/746;
F24C 7/083
(Continued)

(56) References Cited

U.S. PATENT DOCUMENTS 2,282,866 A * 5/1942 Hagen ................... A47J 43/046
200/61.58 R
2,459,224 A * 1/1949 Hendricks ........... A47J 43/0465
310/96
(Continued)

FOREIGN PATENT DOCUMENTS

DE             1131372 A    6/1962
DE        102006052475 A    5/2008
(Continued)

*Primary Examiner* — Eric Stapleton
(74) *Attorney, Agent, or Firm* — Robert J. Hess; Hess Patent Law Firm (57) ABSTRACT

The cooking hob (1) comprises a continuous glass or glass ceramic support plate (2) having a treatment area (4) capable of supporting a cooking vessel (50). A drive motor (6) is operatively connected for rotating a lower magnetic coupling member (5) located below the support plate (2) at the treatment area (4). The cooking vessel (50) is provided with rotary blades (53) connected to an upper magnetic coupling member (54) magnetically coupleable to the lower magnetic coupling member (5) through the support plate (2). The cooking hob (1) and the cooking vessel (50) comprise respective components of detection means for detecting an angular position change of the cooking vessel (50) in relation to the treatment area (4) and electronic control means (30) are configured for modifying or stopping the operation of the electric drive motor (6) when the angular position change is detected.

17 Claims, 4 Drawing Sheets

(51) Int. Cl.
  *A47J 37/10* (2006.01)
  *A47J 36/16* (2006.01)
  *H05B 3/68* (2006.01)
  *H05B 3/74* (2006.01)
  *A47J 43/046* (2006.01)
  *A47J 27/62* (2006.01)
  *H05B 6/12* (2006.01)

(52) U.S. Cl.
  CPC ............ *H05B 3/746* (2013.01); *H05B 6/1209* (2013.01); *H05B 2213/06* (2013.01)

(58) Field of Classification Search
  USPC . 99/337, 341, 342, 348; 219/462.1; 366/274
  See application file for complete search history.

(56) References Cited

U.S. PATENT DOCUMENTS

| | | | | | |
|---|---|---|---|---|---|
| 2,518,758 | A | * | 8/1950 | Cook | B01F 13/0818 15/220.2 |
| 2,548,035 | A | * | 4/1951 | May | A47G 19/14 220/605 |
| 2,619,331 | A | * | 11/1952 | Morrison, Jr. | A47J 43/0465 335/285 |
| 2,932,493 | A | * | 4/1960 | Jacobs | A47J 43/0465 219/433 |
| 3,113,228 | A | * | 12/1963 | Tolegian | A47J 43/0465 310/103 |
| 3,168,294 | A | * | 2/1965 | Hasumura | A47J 43/0465 219/519 |
| 3,172,645 | A | * | 3/1965 | Price, Jr. | A47J 43/0465 366/273 |
| 3,356,349 | A | * | 12/1967 | Keppler | A47J 43/0465 366/146 |
| 3,421,528 | A | * | 1/1969 | Gomez | A61C 17/036 134/188 |
| 3,502,848 | A | * | 3/1970 | Fink | A47J 36/165 219/389 |
| 3,530,499 | A | * | 9/1970 | Schroeder | H05B 3/685 219/621 |
| 3,711,672 | A | * | 1/1973 | Moreland, II | F24C 7/083 126/211 |
| 4,209,259 | A | * | 6/1980 | Rains | B01F 13/0827 366/273 |
| 4,924,591 | A | * | 5/1990 | Brodu | G01B 5/255 33/203.14 |
| 5,280,150 | A | * | 1/1994 | Arai | A21B 2/00 219/726 |
| 5,549,382 | A | * | 8/1996 | Correia, II | B01F 11/0082 126/374.1 |
| 5,834,739 | A | * | 11/1998 | Lockwood | A47J 43/0465 219/433 |
| 5,920,131 | A | * | 7/1999 | Platt | F24C 7/082 219/625 |
| 7,086,778 | B2 | * | 8/2006 | Terentiev | B01F 7/00908 366/273 |
| 2001/0008237 | A1 | * | 7/2001 | Essig | F24C 7/083 219/482 |
| 2002/0027175 | A1 | * | 3/2002 | Capp | A47J 43/046 241/199.12 |
| 2003/0178290 | A1 | * | 9/2003 | Schilling | F24C 7/083 200/6 A |
| 2003/0197080 | A1 | * | 10/2003 | Karkos, Jr. | A23G 9/045 241/92 |
| 2005/0189820 | A1 | * | 9/2005 | Blumenthal | F24C 7/083 307/104 |
| 2009/0314771 | A1 | * | 12/2009 | Okada | H05B 6/062 219/647 |
| 2010/0012647 | A1 | * | 1/2010 | Baier | F24C 7/083 219/482 |

FOREIGN PATENT DOCUMENTS

| | | |
|---|---|---|
| ES | 2371809 A1 | 1/2012 |
| WO | WO 9631739 A1 | 10/1996 |
| WO | WO 2011157865 A1 | 12/2011 |

* cited by examiner

Fig.6

COOKING SYSTEM INCLUDING A COOKING HOB AND A COOKING VESSEL

FIELD OF THE ART

The present invention relates to a cooking system including a cooking hob and a cooking vessel, wherein the cooking hob is provided with a continuous glass or glass ceramic support plate and driving means located below the support plate for driving rotary blades installed inside the cooking vessel when the cooking vessel is supported on the support plate, and wherein the driving means comprise a magnetic coupling device acting through the support plate.

BACKGROUND OF THE INVENTION

Patent U.S. Pat. No. 5,549,382 describes a cooking hob provided with a support plate having several cooking areas, in each of which a cooking vessel can be supported. The hob includes heating means associated with each cooking area and driving means aligned with one of the cooking areas. The driving means comprise a lower magnetic coupling member driven by a motor for rotating below the support plate in a position close enough to it to magnetically transmit torque to an upper magnetic coupling member attached to a stirrer located inside a cooking vessel placed in the corresponding cooking area.

Document DE-A-1131372 discloses a cooking hob comprising a magnetic coupling between a driving device and rotary blades installed inside a vessel. The magnetic coupling is established through a support plate on which the vessel rests.

Patent application DE-A-102006052475 discloses a cooking hob provided with a glass or glass ceramic support plate having several cooking areas associated with heating means and a magnetic coupling driven to rotate a stirrer inside a vessel placed on one of the cooking areas through the support plate.

A drawback of these cooking hobs equipped with a substantially smooth support plate driving means and magnetic coupling through the support plate for rotating rotary blades inside a cooking vessel supported on the support plate is that if for any reason the rotary blades increase resistance to rotation or are locked inside the vessel, then the entire vessel tends to rotate on the support plate driven by the driving means with the risk of ruining the culinary preparation inside the vessel and scratching the support plate.

Documents DE-A-3000593, DE-A-3836099, EP-A-0725556, WO-A-9631739, U.S. Pat. No. 4,587,406 describe different wireless communication systems for communicating between a cooking vessel placed on a cooking area with electric heating means of a cooking hob and the cooking hob for the purpose of transmitting data relating to the cooking conditions, especially the temperature in the vessel, and controlling the electric heating means according to the data received from the vessel by means of a control device. However, the transmitted data, for example the temperature, are scalar magnitudes which do not depend on the angular position of the vessel with respect to the treatment area of the cooking hob, and accordingly are not useful for detecting a change in said angular position, which would be indicative of a rotation of the vessel.

An advantage of the cooking hobs provided with a continuous glass or glass ceramic support plate is that the support plate has a very easy to clean smooth and completely cleared upper surface. Nevertheless, this smooth and cleared surface offers very little resistance to rotation of the vessel, for example, in the event that an increase in the resistance to rotation or a locking of the rotary blades occurs inside the vessel caused by the conditions of the food being processed.

DISCLOSURE OF THE INVENTION

The present invention contributes to solving the aforementioned and other drawbacks by providing a cooking system including a cooking hob and a cooking vessel. The cooking hob comprises a continuous glass or glass ceramic support plate which has a treatment area capable of supporting the cooking vessel thereon, a lower magnetic coupling member rotatably arranged in relation to said treatment area below said support plate, and an electric drive motor operatively connected for rotating said lower magnetic coupling member.

The support plate includes a first visual indication indicating the position of said treatment area relative to the support plate and a second visual indication indicating a predetermined angular position relative to said first visual indication. The first and second visual indications can be provided, for example, by a graphical printing on the support plate or by light emitting elements, such as LEDs, located below the support plate and visible through the support plate when the light emitting elements are on.

The cooking hob further comprises one or more hob components of detection means and electronic control means, such as for example an electronic circuit, a computer, or a programmable logic controller, connected to said hob components of detection means and to said electric drive motor. The cooking vessel comprises a vessel wall that can be supported in the treatment area of the support plate of the cooking hob where the lower magnetic coupling member is located and rotary blades installed inside said vessel wall and connected to an upper magnetic coupling member. The cooking vessel further comprises an appendage attached to the vessel wall and one or more vessel components of detection means located on said appendage. The appendage may be for example a handle or a handle support fixed to the vessel wall.

For example, the upper and lower magnetic coupling members comprise respective permanent magnets generating magnetic fields which are transmitted through the support plate. When the cooking vessel is placed on the treatment area of the support plate indicated by the first visual indication, the upper and lower magnetic coupling members are facing each other so that attractive and repulsive forces caused by the magnetic fields of the respective permanent magnets are capable of magnetically transmitting a driving torque imparted by the electric drive motor to the lower magnetic coupling member to the upper magnetic coupling member through the support plate.

When the cooking vessel is located on the treatment area indicated by said first visual indication with said appendage at said predetermined angular position indicated by said second visual indication, the one or more hob components of detection means included in the cooking hob cooperate with the one or more vessel components of detection means included in the cooking vessel and with the electronic control means to allow a normal operation of the electric drive motor, thereby the driving torque imparted by the electric drive motor to the lower magnetic coupling member of the cooking hob is magnetically transmitted through the support plate to the upper magnetic coupling member and to the rotary blades of the cooking vessel.

If the cooking vessel is not located on the treatment area indicated by said first visual indication with said appendage at said predetermined angular position indicated by said second visual indication, or if the cooking vessel is simply not located on the treatment area, then the one or more hob components of detection means included in the cooking hob do not cooperate with the one or more vessel components of detection means included in the cooking vessel and the electronic control means modify or stop the operation of the electric drive motor whereby rotation of the lower magnetic coupling member of the cooking hob is modified or stopped.

Thus, the lower magnetic coupling member of the cooking hob can only be normally driven by the electric drive motor if the cooking vessel is placed on the treatment area of the support plate and with if the appendage is located at the predetermined angular position.

If during the operation of the cooking hob an increase in torque resistance or even a locking in the rotation of the rotary blades inside the vessel occurs, for example caused by the conditions of the food being processed, then the cooking vessel tends to rotate on the treatment area around a rotation axis of the lower magnetic coupling member due to the driving torque imparted by the electric drive motor and to a relatively low friction between the cooking vessel and the support plate. Therewith, the appendage of the cooking vessel will move out of the predetermined angular position, the hob components of detection means will stop cooperating with the vessel components of detection means and the electronic control means will stop or modify the operation of the electric drive motor.

The cooking hob can optionally comprise an electric heating device, such as for example an electromagnetic induction heater or an electric resistance heater, located below the support plate at the treatment area and preferably arranged around the lower magnetic coupling member. In this case, the electronic control means are further connected to said electric heating device and configured to allow a normal operation of the electric heating device or modifying or stopping the operation of the electric heating device depending on if the cooking vessel is placed on the treatment area of the cooking hob and with the appendage located at the predetermined angular position or not, respectively.

The modification of the normal operation of the electric drive motor by the electronic control means can include, for example, reducing the rotation speed and/or reversing the rotation direction one or more times, as an alternative to stopping it. The modification of the normal operation of the electric heating device can comprise, for example, reducing the energy supplied to them, as an alternative to stopping them. The cooking hob can optionally include a warning device in connection with the electronic control means for warning by means of visual and/or acoustic signals, such that the electronic control means start said warning device at the same time as modifying or stopping the operation of the cooking hob as a result of detecting a change in the position of the appendage of the cooking vessel with respect to the predetermined angular position indicated by the second visual indication at the treatment area.

In one embodiment, the hob components of detection means included in the cooking hob comprise a wave receiver and a wave emitter located below the support plate, and the vessel components of detection means included in the cooking vessel comprise a wave reflector located at the appendage. The wave emitter is provided with a wave directing device, such as for example a frustopyramidal or frustoconical wave directing reflector, and is arranged so as to emit a slightly divergent wave beam through the support plate and directed to the wave reflector of the cooking vessel when the cooking vessel is located on the treatment area with the appendage located at the predetermined angular position. The wave reflector is located and oriented on the appendage of the cooking vessel so as to reflect the slightly divergent wave beam emitted by the wave emitter and redirect it to the wave receiver through the support plate of the cooking hob when the cooking vessel is placed on the treatment area with the appendage located at the predetermined angular position.

Upon receiving from the wave receiver a signal indicative of a change in the position of the appendage of the cooking vessel with respect to the predetermined angular position, the electronic control means modify or stop the operation of the electric drive motor and of the electric heating device if there is any.

Due to a divergence of the slightly divergent wave beam emitted by the wave emitter of the cooking hob, the hob components of detection means and the vessel components of detection means can cooperate between them although the appendage is not exactly at the predetermined angular position. Preferably, said divergence is selected so as to provide a tolerance range of ±10°, and more preferably of ±3°, between a real angular position of the appendage of the cooking vessel and the predetermined angular position indicated by the second visual indication with respect to the treatment area.

In another embodiment, the hob components of detection means included in the cooking hob comprise a wave receiver located below the support plate, and the vessel components of detection means included in the cooking vessel comprise a wave emitter located at the appendage. The wave emitter is provided with a wave directing device, such as for example a frustopyramidal or frustoconical wave directing reflector, and is arranged so as to emit a slightly divergent wave beam to the wave receiver through the support plate of the cooking hob when the cooking vessel is placed on the treatment area with the appendage located at the predetermined angular position.

Upon receiving from the wave receiver a signal indicative of a change in the position of the appendage of the cooking vessel with respect to the predetermined angular position, the electronic control means modify or stop the operation of the electric drive motor and of the electric heating device if there is any.

Preferably, the slightly divergent wave beam emitted by the wave emitter of the cooking vessel has a divergence selected so as to provide a tolerance range of ±10°, and more preferably of ±3°, between a real angular position of the appendage of the cooking vessel and the predetermined angular position indicated by the second visual indication with respect to the treatment area.

According to this embodiment, the cooking system provides several alternative variants for supplying energy to the wave emitter located at the appendage of the cooking vessel.

In one of these alternative variants, the cooking vessel includes an energy storage device housed in the appendage and connected for supplying electric current to the wave emitter. This energy storage device can include, for example, one or more disposable or rechargeable batteries.

In another alternative variant, the cooking vessel can has a photovoltaic cell located at the appendage, exposed to ambient light, and connected for charging an energy storage device, such as one or more rechargeable batteries or an ultracapacitor housed in the appendage, which in turn are configured and arranged for supplying electric current to the wave emitter In still another alternative variant, the cooking hob comprises an energy emitting device located below the support plate and the cooking vessel comprises an energy receiving device located at the appendage and configured and arranged for receiving energy wirelessly emitted by said energy emitter, converting said energy received into electric current, and supplying said electric current to an energy storage device or to the wave emitter installed in the appendage of the cooking vessel. For example, said energy emitting device and said energy receiving device are the primary winding and secondary winding, respectively, of an open core transformer.

The energy emitting device and the energy receiving device are positioned in the support plate and in the appendage of the cooking vessel, respectively, such that they are facing and relatively close to each other when the cooking vessel is placed on the treatment area with the appendage in the predetermined angular position.

In any of the above embodiments, the waves used by the wave emitter, wave reflector and wave receiver are preferably light waves, and more preferably infrared light waves, although laser light waves can also be used. Alternatively, the waves used can be radio frequency waves or another type of waves.

In still another embodiment, the hob components of detection means included in the cooking hob comprise a proximity sensor located below the support plate and the vessel components of detection means included in the cooking vessel comprise a detectable element located at the appendage, the detectable element being detectable by the proximity sensor when the cooking vessel is placed on the treatment area with the appendage at the predetermined angular position.

For example, the proximity sensor is a Hall effect sensor located below the support plate and connected to the electronic control means, and the detectable element is a permanent magnet located at the appendage of the cooking vessel. When the cooking vessel is placed on the treatment area with the appendage at the predetermined angular position, the Hall effect sensor detects a magnetic field generated by the permanent magnet and the electronic control means allow a normal operation of the electric drive motor driving the lower magnetic coupling member and of the electric heating device, if there is any.

If during operation of the cooking system the appendage of the cooking vessel suffers a change in its angular position with respect to the predetermined angular position indicated by the second visual indication associated to the treatment area, the Hall effect sensor stops detecting the magnetic field generated by the permanent magnet and sends to the electronic control means a signal representative of the detection of a variation in the angular position of the cooking vessel with respect to the predetermined angular position, and the electronic control means modify or stop the operation of the electric drive motor and of the electric heating, if there is any.

The Hall effect sensor and the permanent magnet are positioned in the support plate and in the appendage of the cooking vessel, respectively, such that they are facing and device relatively close to each other when the cooking vessel is placed on the treatment area with the appendage in the predetermined angular position. Features of the Hall effect sensor and of the permanent magnet, as well as the distance between them when the cooking vessel is placed on the treatment area with the appendage at the predetermined angular position are selected so as to provide a tolerance range of ±10°, and more preferably of ±3°, between a real angular position of the appendage of the cooking vessel and the predetermined angular position indicated by the second visual indication with respect to the treatment area.

Alternatively, the proximity sensor can be, for example, a capacitive sensor or a photoelectric sensor and the detectable element can be, for example a plastic element or surface of the appendage attached to the vessel wall.

BRIEF DESCRIPTION OF THE DRAWINGS

The foregoing and other features and advantages will be better understood from the following detailed description of several embodiments in reference to the attached drawings, in which.

DETAILED DESCRIPTION OF EXEMPLARY EMBODIMENTS

Figure 1:
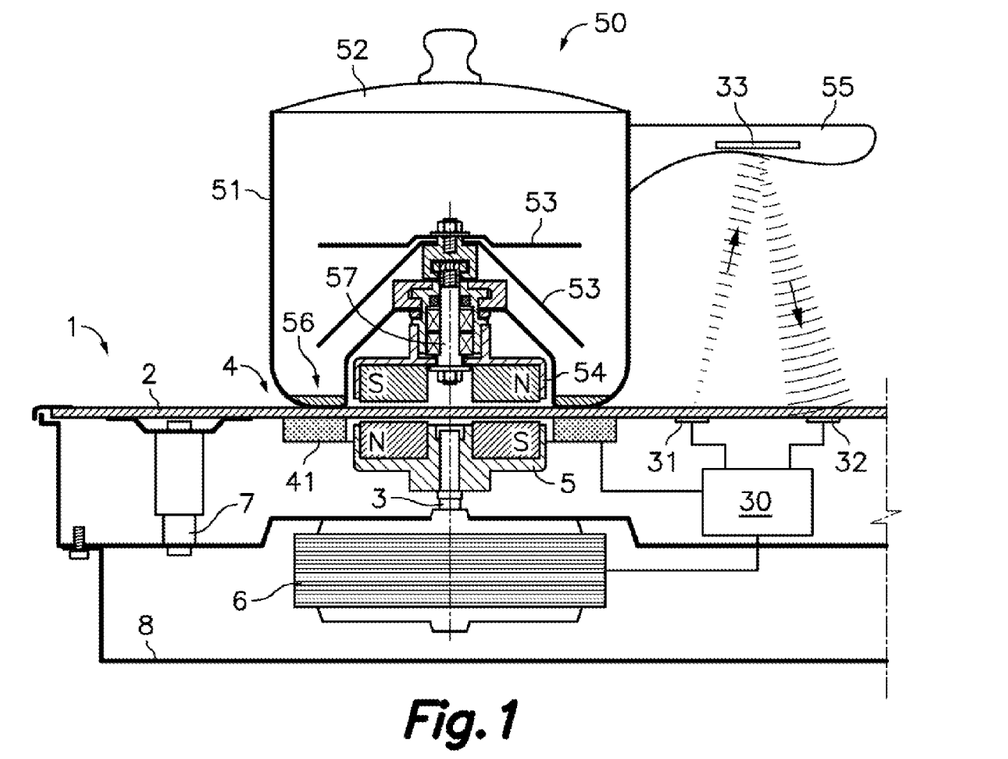
FIG. 1 is a partial cross-section side view of a cooking system including a cooking hob and a cooking vessel according to a first embodiment of the present invention in an operative position.

Referring first to FIG. 1, there is shown a cooking system according to a first embodiment of the present invention which includes a cooking hob 1 and a cooking vessel 50.

The mentioned cooking hob 1 comprises a continuous glass or glass ceramic support plate 2 which has a treatment area 4 capable of supporting the mentioned cooking vessel 50, and a lower magnetic coupling member 5 connected to a drive shaft 3 perpendicular to the support plate 1. The drive shaft 3 is rotatably supported at said treatment area 4 below the support plate 2. An electric drive motor 6 is operatively connected for rotating said lower magnetic coupling member 5. In the illustrated embodiment, the electric drive motor 6 is directly connected to the drive shaft 3, although there can alternatively be mechanical transmission between the electric drive motor 6 and the drive shaft 3.

The treatment area 4 is associated with an electric heating device 41, such as for example an electromagnetic induction heater or an electric resistance heater, located below the support plate 2 and preferably arranged around the lower magnetic coupling member 5. The cooking hob 1 further includes hob components of detection means which will be explained in greater detail below. The electric drive motor 6, the hob components of detection means, and the electric heating device 41 are connected to electronic control means 30, such as for example an electronic circuit, a computer, or a programmable logic controller. When the electric heating device 41 comprises an electromagnetic induction heater, the bottom 56 of the cooking vessel 50 is provided with a ferromagnetic material.

The support plate 2 of the cooking hob 1 can optionally be supported on a base structure 8 by weighing means, which can include for example one or more weight transducers 7 in connection with said control means 30.

The cooking vessel 50 comprises a vessel wall 51 and rotary blades 53 installed inside said vessel wall 51. The rotary blades 53 are connected to an upper magnetic coupling member 54 by means of a blade shaft 57. In the illustrated embodiment, the upper magnetic coupling member 54 is outside the cooking vessel 50, housed in a dome formed in a bottom 56 of the vessel wall 51 and the blade shaft 57 passes through a conveniently sealed opening formed in said bottom 56 of the vessel wall 51, although the upper magnetic coupling member 54 could alternatively be inside the vessel wall 51 close to the bottom 56. The cooking vessel 50 usually includes one or more appendages 55, such as a handle, and a lid 52. The cooking vessel 50 further includes vessel components of detection means, which will be explained in greater detail below, located at the appendage 55.

Figure 2:
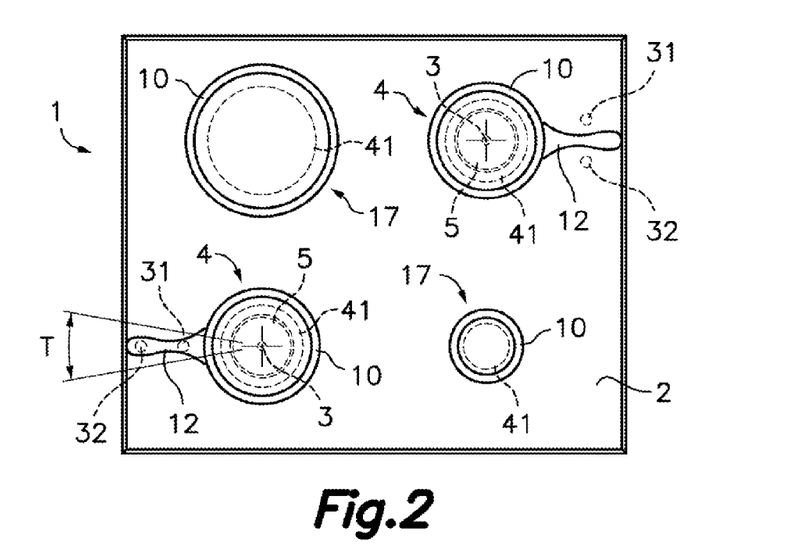
FIG. 2 is a plan view of a support plate of the cooking hob of FIG. 1.

FIG. 2 shows a plan view of the cooking hob 1 of FIG. 1, wherein the support plate 2 includes, in the depicted example, two treatment areas 4 (located at lower left and upper right regions in FIG. 2) associated with respective lower magnetic coupling members 5 and respective electric heating devices 41, and two cooking areas 17 (located at upper left and lower right regions in FIG. 2) associated only with respective heating devices 41. For the purpose of the present invention, however, only a support plate 1 having a single treatment area 4 associated with a lower magnetic coupling member 5 is essential, and the electric heating devices 41 associated with the treatment areas 4 having lower magnetic couplings 5 are optional.

The support plate 2 comprises first visual indications 10 indicating both the treatment areas 4 and the cooking areas 17, and second visual indications 12 indicating a predetermined angular position with respect to each of the treatment areas 4. In the shown example, each first visual indication 10 indicating a treatment area 4 has a circular ring shape centered with the axis of the drive shaft 3 and each second visual indication 12 has a shape similar to an elongated handle radially extending from the corresponding first visual indication 10. The first and second visual indications are provided, for example, by a graphical printing on the support plate. Alternatively, the first and second visual indications could be provided by light emitting elements, such as LEDs, located below the support plate and visible through the support plate when the light emitting elements are on.

In the operative position shown in FIG. 1, the cooking vessel 50 is placed on the treatment area 4 of the support plate 2 indicated by the first visual indication 10, with the blade shaft 57 aligned with the drive shaft 16 and with the appendage 55 of the cooking vessel 50 located at the predetermined angular position indicated by the second visual indication 12 of the treatment area 4, so that the lower and upper magnetic coupling members 5, 54 are facing each other at opposite sides of the support plate 2 and close enough to the support plate so as to magnetically transmit a torque imparted by the electric drive motor 6 to the rotary blades 53 through the support plate 2, and the one or more hob components of detection means included in the cooking hob 1 cooperate with the one or more vessel components of detection means included in the cooking vessel 50.

According to the present invention, the one or more hob components of detection means included in the cooking hob 1 and the one or more vessel components of detection means included in the cooking vessel 50 are configured for detecting an angular position change of the appendage 55 of the cooking vessel 50 in relation to the second visual indication 12 of the treatment area 4, and the electronic control means 30 cooperate with said detection means for modifying or stopping the operation of the electric drive motor 6 and of the electric heating device 41 when the mentioned angular position change of the cooking vessel 50 is detected.

In the first embodiment shown in FIG. 1, the hob components of detection means included in the cooking hob 1 comprise a wave emitter 31 and a wave receiver 32 located adjacent to a lower surface of the support plate 2, which is transparent to the type of waves used by said wave emitter and receiver 31, 32, while the vessel component of detection means included in the cooking vessel 50 is a wave reflector 33 arranged in the appendage 55 of the cooking vessel 50, such as for example the mentioned handle, or in one of the handles if there is more than one, in a position facing the support plate 2 when the cooking vessel 50 is placed on it.

The wave emitter 31 is provided with a wave directing device, such as for example a frustopyramidal or frustoconical wave directing reflector, and is arranged for emitting waves in the shape of a wave beam directed towards the wave reflector 33 located in the handle 55 of the cooking vessel 50 when the cooking vessel 50 is placed on the support plate 2 at the treatment area 4 indicated by the first visual indication 10 and with the appendage located at the predetermined angular position indicated by the second visual indication 12. The wave reflector 33 is arranged for reflecting the wave beam emitted from the wave emitter 31 and redirecting it towards the wave receiver 32 arranged in the cooking hob 1 when the cooking vessel 50 is placed on the treatment area 4 with the appendage 55 at the predetermined angular position. The wave emitter 31 and the wave receiver 32 are in connection with the control means 30. In the treatment area 4 located at the lower left region of FIG. 2, the wave emitter 31 and the wave receiver 32 are located inside the second visual indication 12 and aligned in a radial direction with respect to the first visual indication 10, while in the treatment area 4 located at the upper right region of FIG. 2, the wave emitter 31 and the wave receiver 32 are located outside the second visual indication 12 close to opposite sides thereof.

It will be understood that many other alternative arrangements of the wave emitter 31 and of the wave receiver 32 are possible in relation to the second visual indication 12 provided that they are suitable for emitting waves directed towards the wave reflector 33 located at the appendage 55 of the cooking vessel 50 and for receiving the waves reflected from it. The number and the type of treatment areas 4 can also vary, as can their arrangement in the support plate 2. The first and second visual indications 10, 12 shown in FIG. 2 are also applicable to the second and third embodiments described below. By virtue of the wave directing device, the wave beam emitted by the wave emitter 31 is a divergent wave beam having a divergence selected to allow a tolerance range T of ±10°, and more preferably of ±3°, between a real angular position of the appendage 55 and said predetermined angular position indicated by means of the second visual indication 12 with respect to the treatment area 4.

In order to use the cooking vessel 50 with the cooking hob 1, it is necessary to first place the cooking vessel 40 on the corresponding treatment area 4 approximately centering the vessel wall 51 in relation to the first visual indication 10 and placing the appendage 55 inside the tolerance range T in the predetermined angular position indicated by means of the second visual indication 12. Then, the wave receiver 32 can receive the waves emitted by the wave emitter 31 and reflected by the wave reflector 33. If during operation the cooking vessel 50 suffers an angular position change due for example to an increase in the resistance to rotation or blocking of the rotary blades 53 inside the vessel wall 51 caused by the conditions of the food which is being processed, or by any another cause, the wave reflector 33 will move and the wave receiver 32 will stop receiving the waves emitted by the wave emitter 31. Then, the control means 30 will modify or stop the operation of the electric drive motor 6 and will optionally modify or stop the operation of the electric heating device 41, if there is any.

Figure 3:
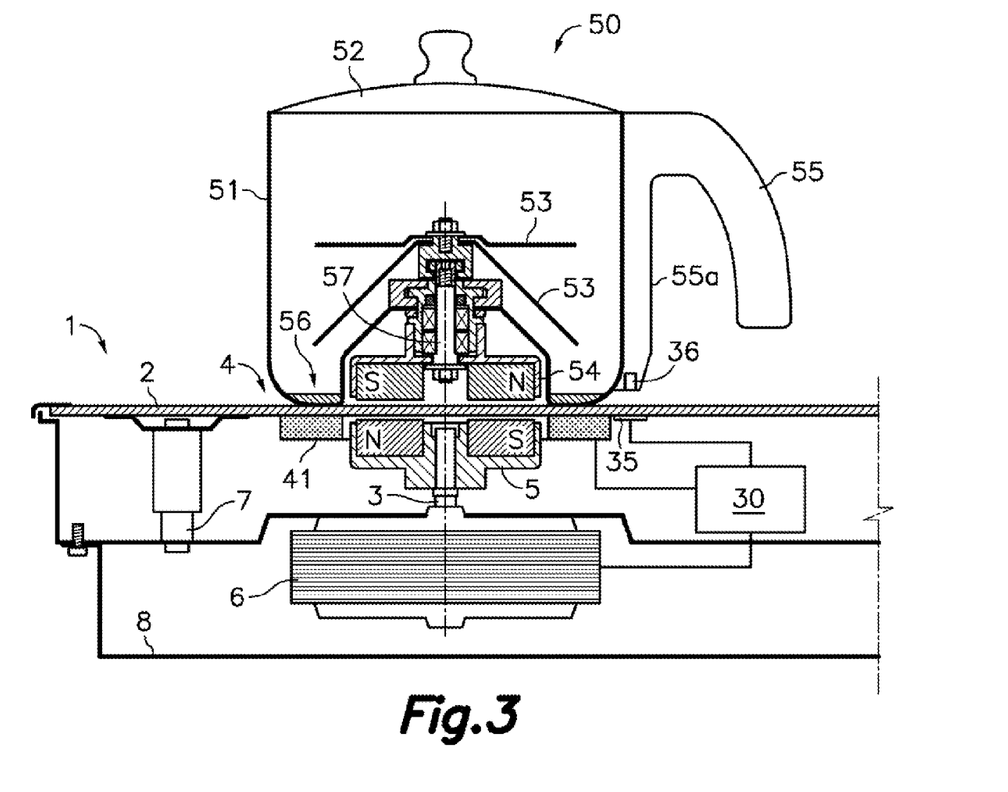
FIG. 3 is a partial cross-section side view of a cooking system including a cooking hob and a cooking vessel according to a second embodiment of the present invention in an operative position.

FIG. 3 shows a second embodiment of the cooking system including a cooking hob 1 and a cooking vessel 50 of the present invention, which is similar in every way to the first embodiment described above in relation to FIG. 1 except in the components of the detection means. Here the hob components of detection means included in the cooking hob 1 comprise a proximity sensor, such as for example a Hall effect sensor 35 located adjacent to a lower surface of the support plate 2, and the vessel components of detection means included in the cooking vessel 50 comprise an element detectable by said proximity sensor, such as for example a permanent magnet 36, housed in the appendage 55 of the cooking vessel 50.

In the second embodiment shown in FIG. 3, the mentioned appendage 55 includes a fixing portion 55a of a handle extending adjacent to an outer surface of the vessel wall 51 from the handle until close to the bottom 56 thereof, although it could alternatively be any other appendage fixed or formed in the vessel wall 51. The permanent magnet 36 is located at a lower end of said fixing portion 55a of the appendage 55, such that when the cooking vessel is placed on the support plate 2, the permanent magnet 36 is close enough to the support plate 2 to be detected by the Hall effect sensor 35 arranged below it.

The Hall effect sensor 35 is arranged in a position suitable for detecting a magnetic field generated by the permanent magnet 36 housed in the appendage 55 of the cooking vessel 50 when the cooking vessel 50 is on the treatment area 4 with the appendage 55 at the predetermined angular position indicated in the support plate 2 by means of a second visual indication 12 similar to those shown in FIG. 2. If the Hall effect sensor 35 detects the magnetic field of the permanent magnet 36, the control means 30 allow the normal operation of the electric drive motor 6 and of the electric heating device 41, if there is any. If the permanent magnet 36 stops detecting the magnetic field of the permanent magnet 36 due to an angular position change of the cooking vessel 50 in relation to the treatment area 4, the control means 30 modify or stop the operation of the electric drive motor 6 and optionally modify or stop the operation of the electric heating device 41, if there are any.

The features of the Hall effect sensor 35 and of the permanent magnet 36, as well as the distance between them when the cooking vessel 50 is placed on the treatment area 4 with the appendage 55 at the predetermined angular position are selected so as to provide a tolerance range of ±10°, and more preferably of ±3°, between a real angular position of the appendage 55 of the cooking vessel 50 and the predetermined angular position indicated by the second visual indication 12 with respect to the treatment area 4.

Figure 4:
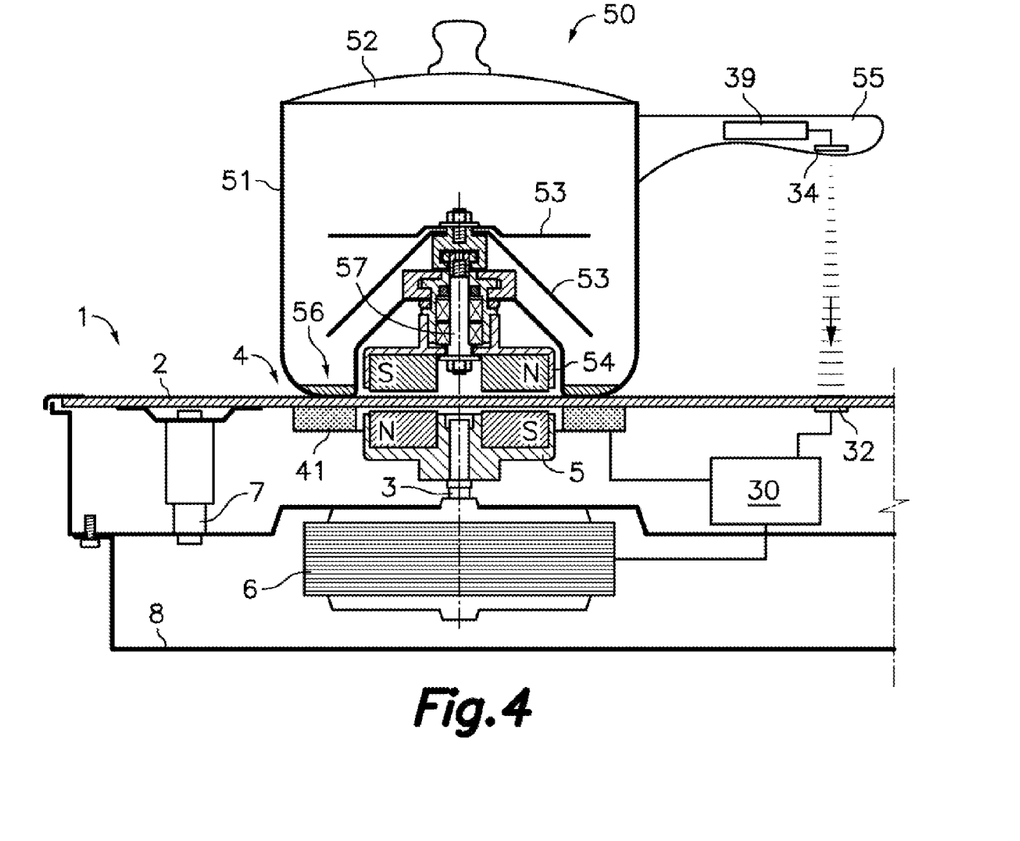
FIG. 4 is a partial cross-section side view of a cooking system including a cooking hob and a cooking vessel according to a third embodiment of the present invention in an operative position.

FIG. 4 shows a third embodiment of the cooking system including a cooking hob 1 and a cooking vessel 50 of the present invention, which is similar in every way to the first embodiment described above in relation to FIG. 1 except in the components of the detection means. Here the hob components of detection means included in the cooking vessel 50 comprise a wave emitter 34 arranged at the appendage 55 of the cooking vessel 50, such as a handle or any other appendage fixed or formed in the vessel wall 51, for emitting waves directed towards the support plate 2 when the cooking vessel 50 is placed on it, and the vessel components of detection means included in the cooking hob 1 comprise a wave receiver 32 located adjacent to a lower surface of the support plate 2 in the cooking hob 1.

The wave emitter 34 is provided with a wave directing device, such as for example a frustopyramidal or frustoconical wave directing reflector, and is arranged for emitting waves in the shape of a wave beam directed towards the wave receiver located below the support plate 2 when the cooking vessel 50 is placed on the treatment area 4 of the support plate 2 indicated by the first visual indication 10 and with the appendage located at the predetermined angular position indicated by the second visual indication 12. The treatment area 4 and the predetermined angular position will be indicated in the support plate 2 by means of first and second visual indications 10, 12, similar to those shown in FIG. 2.

If the wave receiver 32 receives waves from the wave emitter 34, the control means 30 allow the normal operation of the electric drive motor 6 and of the electric heating device 41, if there are any. If due to an angular position change of the appendage 55 of the cooking vessel 50 in relation to the predetermined angular position indicated by the second visual indication 12 with respect to the treatment area 4 the wave receiver 32 stops receiving waves from the wave emitter 34, the control means 30 modify or stop the operation of the electric drive motor 6 and optionally modify or stop the operation of the electric heating device 41, if there is any.

In the third embodiment shown in FIG. 4, an energy storage device 39 connected for supplying electric current to the wave emitter 34 is housed inside the appendage 55 of the cooking vessel 50. The mentioned energy storage device 39 can comprise, for example, one or more disposable batteries or preferably one or more rechargeable batteries.

Figure 5:
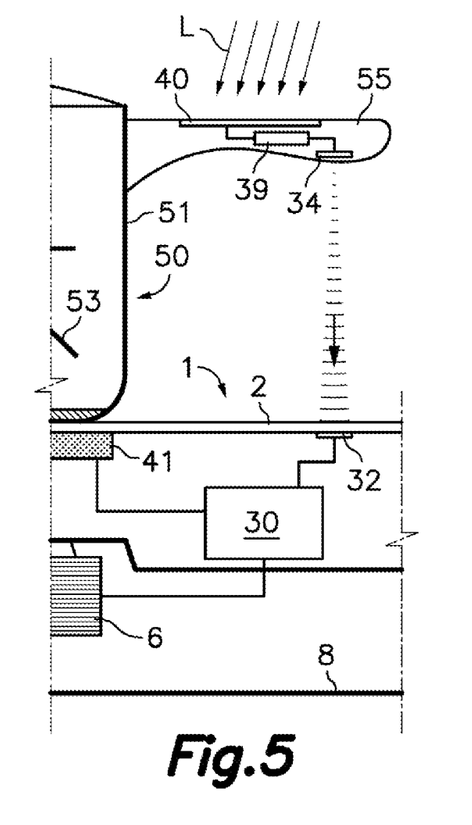
FIG. 5 is a partial cross-section side view of a cooking system including a cooking hob and a cooking vessel according to a variant of the third embodiment of the present invention in an operative position.

FIG. 5 shows a variant of the third embodiment, where the cooking vessel 50 comprises, for example in an upper region of the appendage 55, a photovoltaic cell 40 exposed to ambient light L and connected for charging an energy storage device 39, such as, for example a rechargeable battery or an ultracapacitor, which in turn is configured and arranged for supplying electric current to said wave emitter 34.

Figure 6:
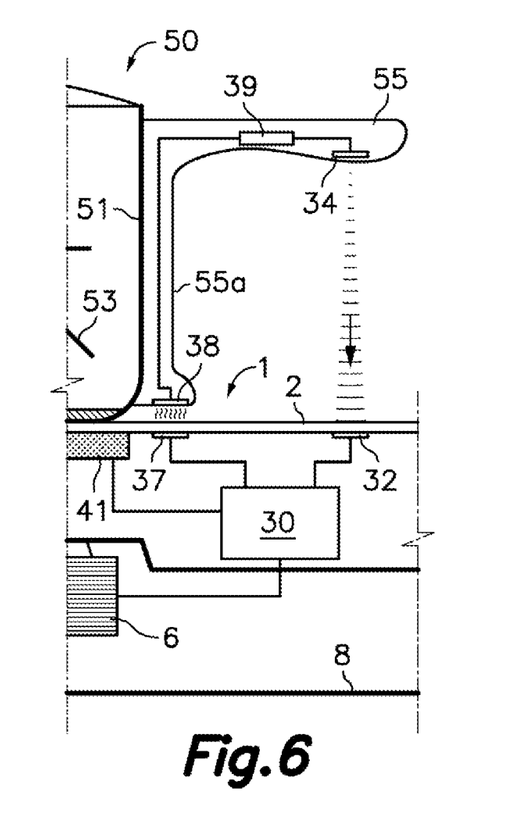
FIG. 6 is a partial cross-section side view of a cooking system including a cooking hob and a cooking vessel according to another variant of the third embodiment of the present invention in an operative position.

FIG. 6 shows another variant of the third embodiment, where the cooking hob 1 comprises an energy emitting device 37 and the cooking vessel 50 comprises an energy receiving device 38 configured and arranged for receiving energy wirelessly emitted by said energy emitter device 37. The energy receiving device 38 is located in a fixing portion 55a of a handle that constitutes the appendage 55, at a position relatively close to the bottom 56 of the cooking vessel 50. The energy emitting device 37 and the energy receiving device 38 are for example the primary winding and secondary winding, respectively, of an open core transformer, and are facing to each other when the cooking vessel 50 is placed on the treatment area 4 of the plate support 2 with the appendage 55 at the predetermined angular position.

The energy received by the mentioned energy receiving device 38 is converted into electric current for supplying said wave emitter 34. In FIG. 6, the energy receiving device 38 is housed in the same appendage 55 as the wave emitter

34, although it could alternatively be arranged in any other appendage of the cooking vessel 50.

A person skilled in that art will envisage modifications and variations to the embodiments shown and described without departing from the scope of the present invention as it is defined in the attached claims.

The invention claimed is:

1. A cooking system including a cooking hob and a cooking vessel, the cooking hob comprising:
    a continuous glass or glass ceramic support plate having a treatment area capable of supporting the cooking vessel thereon;
    a lower magnetic coupling member rotatably arranged below said support plate at the treatment area;
    an electric drive motor operatively connected for rotating said lower magnetic coupling member;
    a first visual indication at said support plate indicating the position of said treatment area relative to the support plate;
    a second visual indication at the support plate indicating a predetermined angular position relative to said first visual indication;
    one or more hob components of detection means; and
    electronic control means connected to said hob components of detection means and to said electric drive motor;
the cooking vessel comprising:
    a vessel wall;
    rotary blades installed inside the vessel wall;
    an upper magnetic coupling member connected to said rotary blades;
    an appendage attached to said vessel wall; and
    one or more vessel components of detection means located at said appendage, wherein:
    the one or more hob components of detection means cooperate with the one or more vessel components of detection means and with said electronic control means to allow the operation of the electric drive motor to make the upper magnetic coupling member rotate with the lower magnetic coupling member when the cooking vessel is located on the treatment area indicated by said first visual indication with said appendage at said predetermined angular position indicated by said second visual indication; and
    the one or more hob components of detection means do not cooperate with the one or more vessel components of detection means, and thereby the electronic control means modify or stop the operation of the electric drive motor, when the appendage of the cooking vessel is not located at said predetermined angular position indicated by said second visual indication.

2. The cooking system according to claim 1, wherein said hob components of detection means comprise a wave receiver arranged below the support plate for receiving waves emitted or reflected from the vessel components of detection means located at the appendage of the cooking vessel when the cooking vessel is located on the treatment area indicated by the first visual indication with the appendage at the predetermined angular position indicated by the second visual indication.

3. The cooking system according to claim 2, wherein the vessel components of detection means comprise a wave reflector located at the appendage of the cooking vessel and the hob components of detection means further comprise a wave emitter arranged below the support plate and arranged for emitting a wave beam directed towards said wave reflector when the cooking vessel is located on the treatment area indicated by the first visual indication with the appendage at the predetermined angular position indicated by the second visual indication.

4. The cooking system according to claim 3, wherein the wave emitter is provided with a wave directing device providing a divergent wave beam having a divergence selected so as to provide a tolerance range of ±10° between a real angular position of the appendage of the cooking vessel and the predetermined angular position indicated by the second visual indication with respect to the treatment area.

5. The cooking system according to claim 4, wherein said tolerance range is of ±3°.

6. The cooking system according to claim 2, wherein the vessel components of detection means comprise a wave emitter located at the appendage of the cooking vessel and arranged for emitting a wave beam directed towards said wave receiver when the cooking vessel is located on the treatment area indicated by the first visual indication with the appendage at the predetermined angular position indicated by the second visual indication.

7. The cooking system according to claim 6, wherein the wave emitter is provided with a wave directing device providing a divergent wave beam having a divergence selected so as to provide a tolerance range of ±10° between a real angular position of the appendage of the cooking vessel and the predetermined angular position indicated by the second visual indication with respect to the treatment area.

8. The cooking system according to claim 7, wherein said tolerance range is of ±3°.

9. The cooking system according to claim 6, wherein the cooking vessel comprises an energy storage device arranged at the appendage and connected for supplying electric current to said wave emitter.

10. The cooking system according to claim 9, wherein said energy storage device is a rechargeable energy storage device and the cooking vessel further comprises a photovoltaic cell arranged at the appendage, exposed to light and connected for charging said rechargeable energy storage device.

11. The cooking system according to claim 6, wherein the cooking hob comprises an energy emitting device located below the support plate and the cooking vessel comprises an energy receiving device located at the appendage and arranged for receiving energy wirelessly emitted by said energy emitter when the cooking vessel is located on the treatment area indicated by the first visual indication with the appendage at the predetermined angular position indicated by the second visual indication, said energy receiving device converting said energy received into electric current, and supplying said electric current to a rechargeable energy storage device located at the appendage of the cooking vessel or to said wave emitter.

12. The cooking system according to claim 11, wherein said energy emitting device and said energy receiving device are a primary winding and a secondary winding, respectively, of an open core transformer.

13. The cooking system according to claim 1, wherein said vessel components of detection means comprise a detectable element located at said appendage of the cooking vessel and said hob components of detection means comprise a proximity sensor located below the support plate and arranged for detecting a said detectable element through the support plate when the cooking vessel is located on the treatment area indicated by the first visual indication with the appendage at the predetermined angular position indicated by the second visual indication.

14. The cooking system according to claim 13, wherein said detectable element comprises a permanent magnet located at said appendage of the cooking vessel and said proximity sensor comprises a Hall effect sensor arranged for detecting a magnetic field generated by said permanent magnet through the support plate.

15. The cooking system according to claim 14, wherein the Hall effect sensor, the permanent magnet, and a distance between the Hall effect sensor and the permanent magnet when the cooking vessel is placed on the treatment area with the appendage at the predetermined angular position are selected so as to provide a tolerance range of ±10° between a real angular position of the appendage of the cooking vessel and the predetermined angular position indicated by the second visual indication with respect to the treatment area.

16. The cooking system according to claim 15, wherein said tolerance range is of ±3°.

17. The cooking system according to claim 1, further comprising an electric heating device associated with the treatment area and connected to said electronic control means, the electronic control means modifying or stopping the operation of said electric heating device when the appendage of the cooking vessel is not located at said predetermined angular position indicated by said second visual indication.

\* \* \* \* \*